UNITED STATES PATENT OFFICE 2,681,934

SUBSTITUTED DIPHENYLALKYLAMINES

Edward B. Hodge, Terre Haute, Ind., assignor to Commercial Solvents Corporation, Terre Haute, Ind., a corporation of Maryland No Drawing. Application January 6, 1950,
Serial No. 137,267

6 Claims. (Cl. 260—570)

This invention relates to new amines and more particularly to new substituted diphenylalkylamines.

The new compounds of my invention have the structural formula:

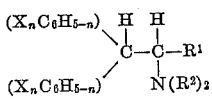

wherein $R^1$ is a member selected from the group consisting of methyl and ethyl, $R^2$ is a member selected from the group consisting of hydrogen and methyl, X is a halogen and n is an integer selected from the group consisting of 1 and 2. Compounds included within this formula are (2,2-bis-p-chlorophenylisopropyl)-amine, (2-o-chlorophenyl - 2 - p - chlorophenylisopropyl) - amine, (2,2 - bis - p - chlorophenylisopropyl) - dimethylamine, (2,2-bis-p-chlorophenyl-1-ethylethyl) amine, (2-p-chlorophenyl-2-o,p-dichlorophenylisopropyl) amine, (2-o-chlorophenyl-2-p-chlorophenyl-1-ethylethyl) amine, (2-o-chlorophenyl - 2 - p - chlorophenylisopropyl) dimethyl - amine, (2-o-chlorophenyl-2-p-fluorophenylisopropyl) amine and (2-p-bromophenyl-2-o-chlorophenylisopropyl) amine.

The amines of my invention are produced by a two step process wherein a halobenzene is condensed with a nitro-halophenyl-alkanol to produce a halosubstituted diphenylnitroalkane according to the method of Muller as disclosed in United States Patent 2,397,802. The halosubstituted diphenylnitroalkane is then dissolved in methanol and catalytically reduced at a temperature of about 50° C. and a pressure of about 1500 lbs. per sq. inch to form the amine. The following reaction equations are offered to illustrate the preparation of my new compounds using the preparation of (2,2-bis-p-chlorophenylisopropyl) amine as an example.

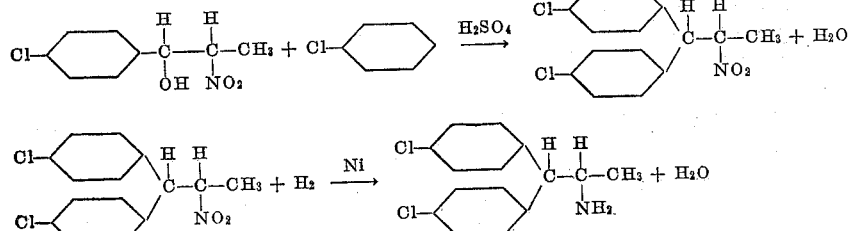

In preparing the N,N-dialkyl compounds of my invention, a substituted (diphenylalkyl) amine is dissolved in methanol along with an aliphatic aldehyde and this solution subsequently reduced catalytically at 50° C. and 1500 p. s. i.

The novel compounds of my invention when converted to their hydrochlorides possess bacteriostatic activity. The hydrochlorides are produced by dissolving the amines in ether and then saturating the solution with dry gaseous hydrogen chloride. The following table shows the minimal inhibition concentration of the hydrochlorides when tested against the organisms listed.

TABLE

|  | Minimal Inhibition Conc., Micrograms/ml. | | | | |
|---|---|---|---|---|---|
|  | 1* | 2* | 3* | 4* | 5* |
| Staph. aureus | 50 | 50 | >100 | 100 | >100 |
| Strep. fecalis | 50 | 25 | >100 | 100 | >100 |
| Strep. hemolyticus | 50 | 50 | >100 | >100 | >100 |
| E. coli | 100 | 100 | >100 | >100 | >100 |
| Shigella dysenteriae | 50 | 50 | >100 | >100 | >100 |
| Pasteurella pseudo tuberculosis | 20 | 25 | >100 | >100 |  |
| Mycobacterium ranae | 10 | >100 | 100 |  | 100 |
| Mycobacterium tuberculosis |  |  |  |  | 100 |

\*1. (2,2-bis-p-chlorophenylisopropyl)ammonium chloride.
\*2. (2-o-chlorophenyl-2-p-chlorophenylisopropyl)ammonium chloride.
\*3. (2-o-chlorophenyl-2-p-chlorophenylisopropyl)dimethylammonium chloride.
\*4. (2-o-bromophenyl-2-o-chlorophenylisopropyl)ammonium chloride.
\*5. (2-o-chlorophenyl-2-p-fluorophenylisopropyl)ammonium chloride.

The following examples are offered to illustrate my invention and are not to be construed as limiting it in any way.

EXAMPLE I

*(2,2-bis-p-chlorophenylisopropyl) amine*

A 50 g. portion of 2-nitro-1,1-bis-(p-chlorophenyl)-propane was dissolved in 750 ml. of methanol and hydrogenated at 50° C. and 1500 lbs. per sq. inch using 10 gms. of Raney nickel as a catalyst. After hydrogenation was complete and the catalyst was removed, the methanol was evaporated and the residue dissolved in 15 ml. of concentrated HCl in 115 ml. of water. This solution was extracted with three 100 ml. portions of ether and then dissolved in a solution of 30 gms. of sodium hydroxide in 100 ml. of water. This solution was extracted with two 100 ml. portions of ether, the ether was dried over anhydrous sodium sulfate and the solution then distilled at reduced pressure. The distillate was a colorless liquid which slowly crystallized to soft crystals of the product. (B. P. 156–161° C. at 2 mm. pressure. Nitrogen analysis: per cent N, theory 5.00; found 5.00.)

EXAMPLE II

*(2-o-chlorophenyl-2-p - chlorophenylisopropyl)-amine*

A 50 g. portion of 2-nitro-1-o-chlorophenyl-1-p-chlorophenylpropane was dissolved in 800 ml. of methanol and the solution hydrogenated at 50° C. and 1500 p. s. i. After removal of the methanol on a steam bath, the residue was distilled to give the amine as the distillate. (B. P. 133–139° C. at 1 mm. pressure. Nitrogen analysis: per cent N, theory 5.00; found 4.93.)

EXAMPLE III

*(2,2-bis-p-chlorophenylisopropyl) dimethylamine*

A 104 gm. portion of 2,2-bis(p-chlorophenyl) isopropylamine was dissolved in 500 ml. of methanol and to this solution 20 g. of paraformaldehyde was then added. The mixture was heated to boiling and then hydrogenated at 50° C. and 1500 p. s. i. using 10 g. of Raney nickel as a catalyst. The methanol was then removed on a steam bath leaving a total of 60 gms. of the product as the residue. (Analysis: per cent N, theory 4.55; found 4.69. Per cent Cl, theory 23.0; found 22.0.)

EXAMPLE IV

*(2-p-chlorophenyl-2-o,p-dichlorophenylisopropyl) amine*

A 29 g. portion of 2-nitro-1-(2,4-dichlorophenyl)-1-p-chlorophenylpropane, was dissolved in 600 ml. of methanol and the solution then hydrogenated at 50° C. and 1500 p. s. i. After removal of the methanol on a steam bath, the residue crystallized. The crystals were dissolved in 100 ml. of ether and the solution saturated with dry HCl. A precipitate formed which was recrystallized from cyclohexane to give 12.6 g. of the product. (Chlorine analysis: per cent Cl, theory 40.51; found 40.30.)

EXAMPLE V

*(2-o-chlorophenyl-2-p-chlorophenyl-1-ethylethyl)-ammonium chloride*

A 50 g. portion of 2-nitro-1-o-chlorophenyl-1-p-chlorophenylbutane was dissolved in 800 ml. of methanol and the solution then hydrogenated at 50° C. and 1500 p. s. i. pressure. The methanol was removed on a steam bath and the residue poured into 300 ml. of concentrated hydrochloric acid. The precipitate which formed was filtered, dissolved in benzene, reprecipitated with ether and then recrystallized from cyclohexane. This gave 14.1 g. of the product. (Chlorine analysis: Cl per cent, theory 32.2; found 32.0.)

EXAMPLE VI

*(2-p-bromophenyl-2-o-chlorophenylisopropyl) ammonium chloride*

This compound was prepared by the method of Example IV. (Analysis: per cent N, theory 3.83; found 3.71. Per cent Cl, theory 19.69; found 19.25. Per cent Br, theory 21.7; found 22.1.)

EXAMPLE VII

*(2-o-bromophenyl-2-p-fluorophenylisopropyl) ammonium chloride*

This compound was prepared by the method of Example IV. (Analysis: per cent Cl, theory 23.62; found 23.23. Per cent N, theory 4.67; found 4.53.)

What I claim is:

1. As a new composition of matter, compounds of the formula:

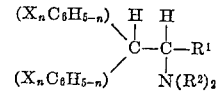

wherein $R^1$ is a member of the group consisting of methyl and ethyl, $R^2$ is a member of the group consisting of hydrogen and methyl, X is a halogen and $n$ is an integer selected from the group consisting of 1 and 2.

2. As a new composition of matter, (2,2-bis-p-chlorophenylisopropyl) amine having the structural formula:

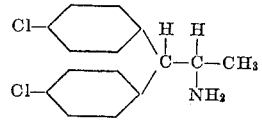

3. As a new composition of matter, (2-o-chlorophenyl-2-p-chlorophenylisopropyl) amine having the structural formula:

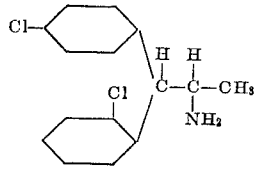

4. As a new composition of matter, (2-o-chlorophenyl-2-p - chlorophenylisopropyl) dimethyl - amine having the structural formula:

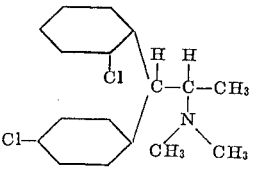

5. As a new composition of matter, (2,2-bis-p-chlorophenyl - 1 - ethylethyl) amine having the structural formula:

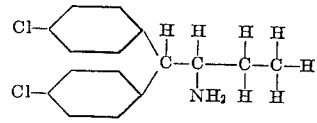

6. As a new composition of matter, (2-p-chlorophenyl - 2 - o,p-dichlorophenylisopropyl) amine having the structural formula:

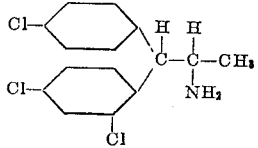

References Cited in the file of this patent

UNITED STATES PATENTS

| Number | Name | Date |
|---|---|---|
| 2,204,749 | Coffey et al. | June 18, 1940 |
| 2,516,186 | Hass et al. | July 25, 1950 |

FOREIGN PATENTS

| Number | Country | Date |
|---|---|---|
| 311,465 | Great Britain | May 16, 1929 |

OTHER REFERENCES

Beilsteins Handbuch der Organischen Chemie, vol. 12, Second Supplement, p. 773.